(12) United States Patent
Fukuda

(10) Patent No.: US 7,980,974 B2
(45) Date of Patent: Jul. 19, 2011

(54) APPARATUS FOR MOUNTING A BICYCLE ELECTRICAL COMPONENT

(75) Inventor: Masahiko Fukuda, Amagasaki (JP)

(73) Assignee: Shimano, Inc., Sakai-ku, Sakai (JP)

( * ) Notice: Subject to any disclaimer, the term of this patent is extended or adjusted under 35 U.S.C. 154(b) by 783 days.

(21) Appl. No.: 11/162,507

(22) Filed: Sep. 13, 2005

(65) Prior Publication Data

US 2006/0100045 A1    May 11, 2006

(30) Foreign Application Priority Data

Nov. 10, 2004  (JP) ................................. 2004-325829

(51) Int. Cl.
*F16H 61/00*    (2006.01)
*F16H 9/00*     (2006.01)
*F16H 59/00*    (2006.01)

(52) U.S. Cl. ................ 474/70; 474/80; 474/82

(58) Field of Classification Search ............... 474/70, 474/80, 82; 343/872; 361/160, 179
See application file for complete search history.

(56) References Cited

U.S. PATENT DOCUMENTS

| 3,863,512 A | 2/1975 | Crawley ........................ 74/217 |
| 3,919,891 A | 11/1975 | Stuhlmuller et al. ............ 74/217 |
| 4,041,788 A | 8/1977 | Nininger, Jr. ................. 74/217 B |
| 4,567,543 A | 1/1986 | Miniet |
| 4,605,240 A | 8/1986 | Clem et al. ................... 280/236 |
| 4,928,206 A | 5/1990 | Porter et al. |
| 4,946,425 A | 8/1990 | Buhlmann ..................... 474/80 |
| 4,952,196 A | 8/1990 | Chilcote et al. ................ 474/70 |
| 5,177,432 A | 1/1993 | Waterhouse et al. ........ 324/166 |
| 5,193,895 A | 3/1993 | Naruke et al. ................. 362/80 |
| 5,213,548 A | 5/1993 | Colbert et al. ................. 474/71 |
| 5,328,414 A | 7/1994 | Ancarani Restelli ......... 474/80 |
| 5,357,177 A | 10/1994 | Fey et al. ......................... 318/3 |
| 5,358,451 A | 10/1994 | Lacombe et al. ............. 474/78 |
| 5,470,277 A | 11/1995 | Romano ......................... 474/70 |
| 5,480,356 A | 1/1996 | Campagnolo .................. 474/70 |
| 5,483,137 A | 1/1996 | Fey et al. ...................... 318/560 |
| 5,569,104 A | 10/1996 | Bellio et al. ................... 474/70 |
| 5,599,244 A | 2/1997 | Ethington ...................... 474/70 |
| 5,873,283 A | 2/1999 | Chen et al. ................. 74/473.12 |
| 5,903,440 A | 5/1999 | Blazier et al. |

(Continued)

FOREIGN PATENT DOCUMENTS

EP          529664 A2    3/1993

(Continued)

OTHER PUBLICATIONS

European search report for EP 05024296.5, the European application that corresponds to this application, dated Aug. 5, 2008.

Primary Examiner — Michael Mansen
Assistant Examiner — Robert Reese
(74) Attorney, Agent, or Firm — James A. Deland

(57) ABSTRACT

An apparatus for mounting a bicycle electrical component comprises a housing member structured to be mounted to a bicycle and an electronic circuit element mounted to a circuit mounting member, wherein the circuit mounting member is disposed in the housing. The circuit mounting member has a shape that varies away from a plane containing the electronic circuit element to conform to a shape of the housing member.

34 Claims, 7 Drawing Sheets

U.S. PATENT DOCUMENTS

| | | | |
|---|---|---|---|
| 6,023,646 A | 2/2000 | Kubacsi et al. | 701/1 |
| 6,162,140 A | 12/2000 | Fukuda | 474/70 |
| 6,623,389 B1 * | 9/2003 | Campagnolo | 474/70 |
| 6,726,586 B2 * | 4/2004 | Fukuda | 474/70 |
| 6,842,325 B2 | 1/2005 | Meehleder et al. | |
| 6,899,649 B2 | 5/2005 | Ichida et al. | |
| 6,909,405 B2 * | 6/2005 | Kondo | 343/872 |
| 2003/0092519 A1 | 5/2003 | Fukuda | 474/70 |
| 2003/0106974 A1 * | 6/2003 | Guertin | 248/309.1 |
| 2004/0043850 A1 | 3/2004 | Ichida et al. | 474/70 |
| 2004/0102269 A1 | 5/2004 | Fukuda et al. | 474/82 |
| 2005/0018404 A1 * | 1/2005 | Hein | 361/719 |
| 2005/0197222 A1 * | 9/2005 | Tatsumi | 474/80 |

FOREIGN PATENT DOCUMENTS

| | | |
|---|---|---|
| EP | 1394035 A2 | 3/2004 |
| EP | 1422135 A2 | 5/2004 |
| JP | 54-38041 | 3/1979 |
| JP | 05-262276 A | 10/1993 |
| JP | 05-319357 A | 12/1993 |
| JP | 06-048368 A | 2/1994 |
| KR | 2003-0047454 A | 6/2003 |

* cited by examiner

APPARATUS FOR MOUNTING A BICYCLE ELECTRICAL COMPONENT

BACKGROUND OF THE INVENTION

The present invention is directed to bicycles and, more particularly, to an apparatus for mounting a bicycle electrical component.

Recently, bicycles have been equipped with various electrical components used to facilitate the operation of the bicycle. For example, various electrical devices may be used to operate the bicycle transmission or to provide an assisting force to facilitate pedaling the bicycle. See, for example, Japanese Laid-Open Patent Application No. 2004-90915.

Many bicycles have derailleur operated transmissions. Such transmissions usually include a plurality of front sprockets and a plurality of rear sprockets, wherein the plurality of front sprockets are mounted for rotation coaxially with the pedal cranks, and the plurality of rear sprockets are mounted for rotation coaxially with the rear wheel. A front derailleur is mounted to the bicycle frame in close proximity to the plurality of front sprockets to selectively engage a chain with one of the plurality of front sprockets, and a rear derailleur is mounted to the bicycle frame in close proximity to the plurality of rear sprockets to selectively engage the chain with one of the plurality of rear sprockets.

Electrical devices have been used to control such derailleur operated transmissions. A typical electrically operated derailleur, for example, comprises a housing member mounted to the bicycle, a drive unit such as a motor disposed in the housing member, a gear shift cable connected between the motor and the derailleur, a gear shift controller disposed in the housing member next to the drive unit for controlling the operation of the motor, and a shift control device typically mounted on the bicycle handlebar for providing gear shift signals. The gear shift signals may be provided automatically in response to bicycle speed or manually in response to the operation of a lever or button by the rider. The gear shift controller usually includes a control unit comprising a programmed microprocessor mounted on a flat circuit substrate such as a printed circuit board. The gear shift controller causes the motor to move the gear shift cable in response to the gear shift signals from the shift control device, thereby moving the derailleur to position the chain on the desired sprocket.

In a typical electrically controlled device, the control unit mounted to the flat circuit substrate is disposed adjacent to the drive unit in the housing member. As a result, the housing member must be constructed with a housing space large enough to accommodate both the drive unit and the flat circuit substrate. Because the circuit substrate typically has a square or rectangular shape, the housing member often must be made larger than desired, with needless and wasteful space inside the housing member. The larger housing member also makes the electrically operated component larger and heavier. Since the bicycle is powered by human pedaling, the added weight increases the effort required by the rider.

SUMMARY OF THE INVENTION

The present invention is directed to various features of an apparatus for mounting a bicycle electrical component. In one embodiment, an apparatus for mounting a bicycle electrical component comprises a housing member structured to be mounted to a bicycle and an electronic circuit element mounted to a circuit mounting member, wherein the circuit mounting member is disposed in the housing. The circuit mounting member has a shape that varies away from a plane containing the electronic circuit element to conform to a shape of the housing member. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
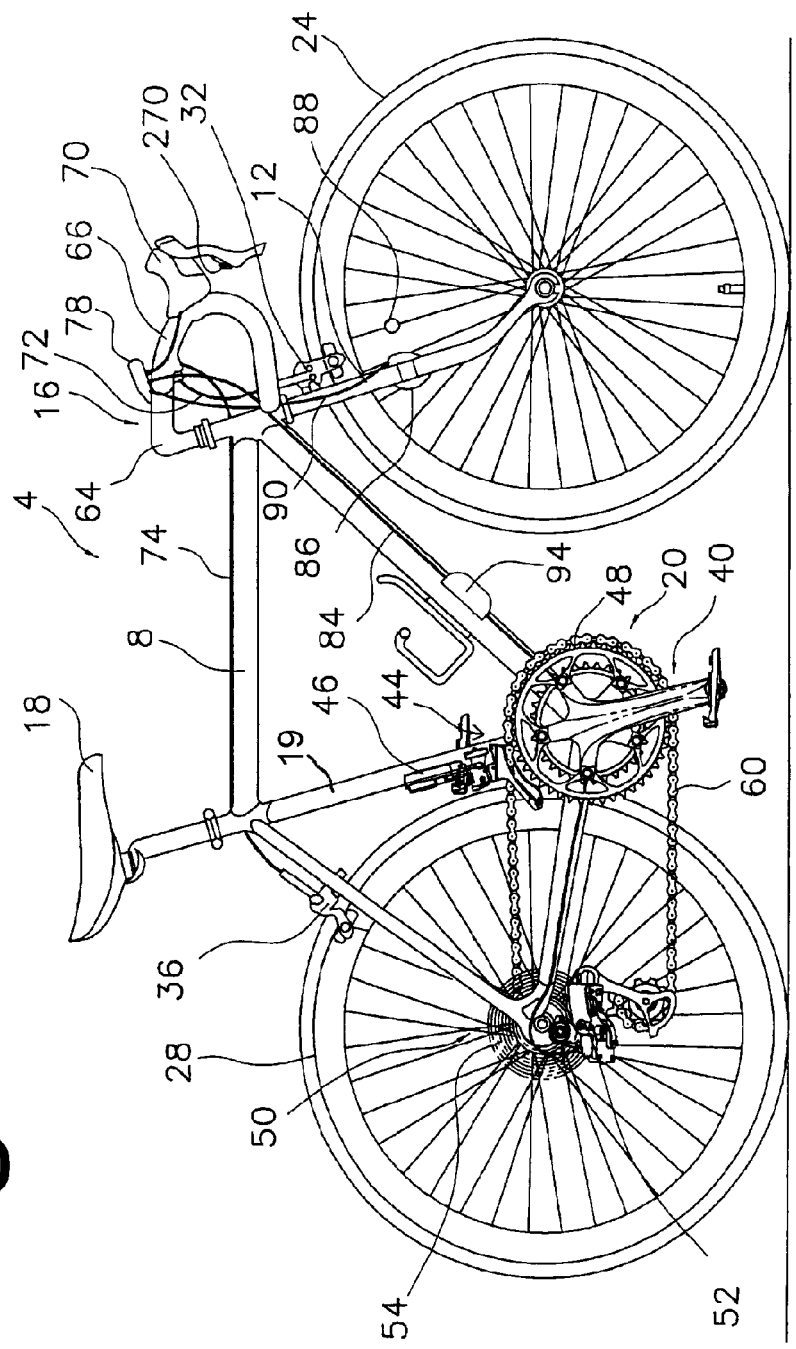
FIG. 1 is a side view of a particular embodiment of a bicycle.

FIG. 1 is a side view of a bicycle 4. Bicycle 4 is a road bicycle comprising a diamond-shaped frame 8, a front fork 12 rotatably mounted to frame 8, a handlebar assembly 16 mounted to the upper part of fork 12, a front wheel 24 rotatably attached to the lower part of fork 12, a rear wheel 28 rotatably attached to the rear of frame 8, a saddle 18 mounted to a seat tube 19 of frame 8, and a drive unit 20. A front wheel brake 32 is provided for braking front wheel 24, and a rear wheel brake 36 is provided for braking rear wheel 28.

Drive unit 20 comprises a chain 60, a front sprocket assembly 44 coaxially mounted with a pedal-operated crank 40, an electrically controlled front derailleur 46 attached to seat tube 19, a rear sprocket assembly 50 coaxially mounted with rear wheel 28, and an electrically controlled rear derailleur 52. Front sprocket assembly 44 comprises a plurality of (e.g., two) coaxially mounted sprockets 48, and rear sprocket assembly 50 comprises a plurality of (e.g., eight to ten) sprockets 54. Front derailleur 46 moves to a plurality of operating positions to switch chain 60 among front sprockets 48, and rear derailleur 52 moves to a plurality of operating positions to switch chain among selected ones of the rear sprockets 54.

A handlebar stem 64 is mounted to the upper portion of front fork 12, and a drop-style handlebar 66 is mounted to a front portion of handlebar stem 64. A combined brake and shift control device 70 with a gear shift switch 270 mounted behind a brake lever is mounted the right side of handlebar 66. A similar combined brake and shift control device 70 is mounted to the left side of handlebar 66. The gear shift switches 270 may comprise lever-type switches, for example, and upshift or downshift operations may be performed by moving the switches in different directions. The right side brake and shift control device 70 controls the operation of rear brake 36 through a Bowden cable 74, and the left side combined brake and shift control device 70 controls the operation of front brake 32 through a Bowden cable 72. Gear shift switch 270 on the right side brake and shift control device 70 controls the operation of rear derailleur 52, and gear shift switch 270 on the left side brake and shift control device 70 controls the operation of front derailleur 46.

A cycle computer 78 receives electrical gear shift command signals from gear shift switches 270 as well as speed indicating signals from a wheel speed sensor 86 through electrical wiring 90. Wheel speed sensor 86 may comprise a reed switch that provides an electrical pulse in response to the passage of a magnet 88 mounted to front wheel 24. Cycle computer 78 includes a conventional display for displaying information such as speed and travel distance based on the signals from wheel speed sensor 86. Cycle computer 78 communicates control signals for operating front and rear derailleurs 46 and 52 through electrical wiring 84. Cycle computer 78 also receives power signals from a power supply 94 through electrical wiring 84. Power supply 94 may comprise a replaceable primary or secondary battery.

Figure 2:
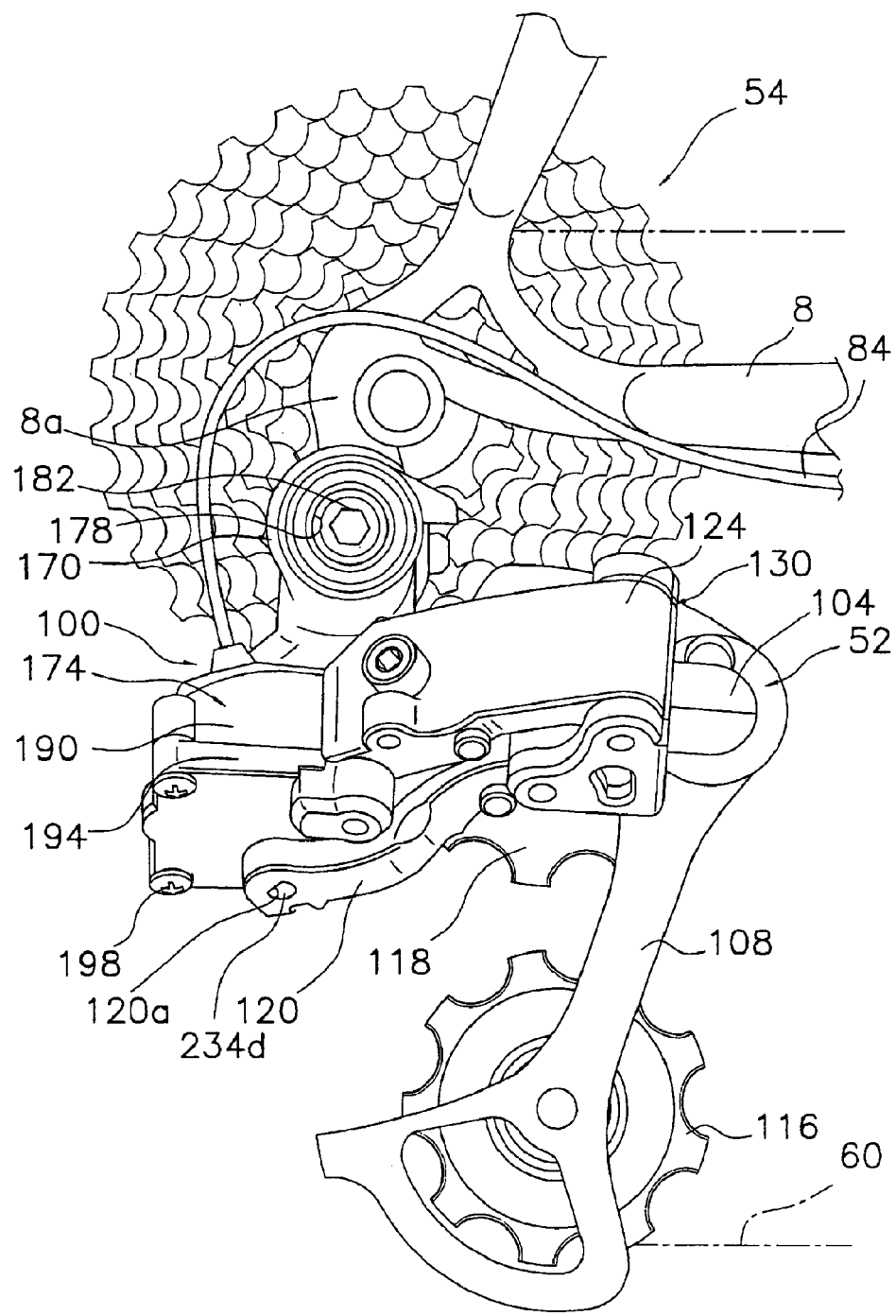
FIG. 2 is a detailed view of a particular embodiment of a rear derailleur.

As shown in FIG. 2, rear derailleur 52 includes a base member 100 secured to a rear part 8a of frame 8, a moving mechanism 130 that can move toward or away from rear wheel 28 relative to base member 100, a movable member 104 connected to moving mechanism 130, and a chain guide 108 pivotably connected to movable member 104. Base member 100 includes an essentially cylindrical frame mounting unit 170 and a housing unit 174. Frame mounting unit 170 includes a bolt mounting opening 178. Base member 100 is secured to frame body 8 by a frame mounting bolt 182 that passes through bolt mounting opening 178 such that the rotational position of base member 100 may be adjusted.

Moving mechanism 130 comprises a first link member 120 and a second link member 124 positioned outside of first link member 120, wherein a first end of each of first link member 120 and second link member 124 is connected to base member 100. Link members 120 and 124 are disposed essentially parallel to each other. A second end of each first link member 120 and second link member 124 is pivotally connected to movable member 104. A biasing member (not shown) comprising a coil spring, for example, is mounted between movable member 104 and chain guide 108 for biasing chain guide 108 clockwise in FIG. 2 in a conventional manner. Chain guide 108 rotatably supports a guide pulley 118 and a tension pulley 116, wherein guide pulley 118 guides chain 60 to engage selected ones of the plurality of rear sprockets 54, and tension pulley 116 applies tension to chain 60.

Figure 3:
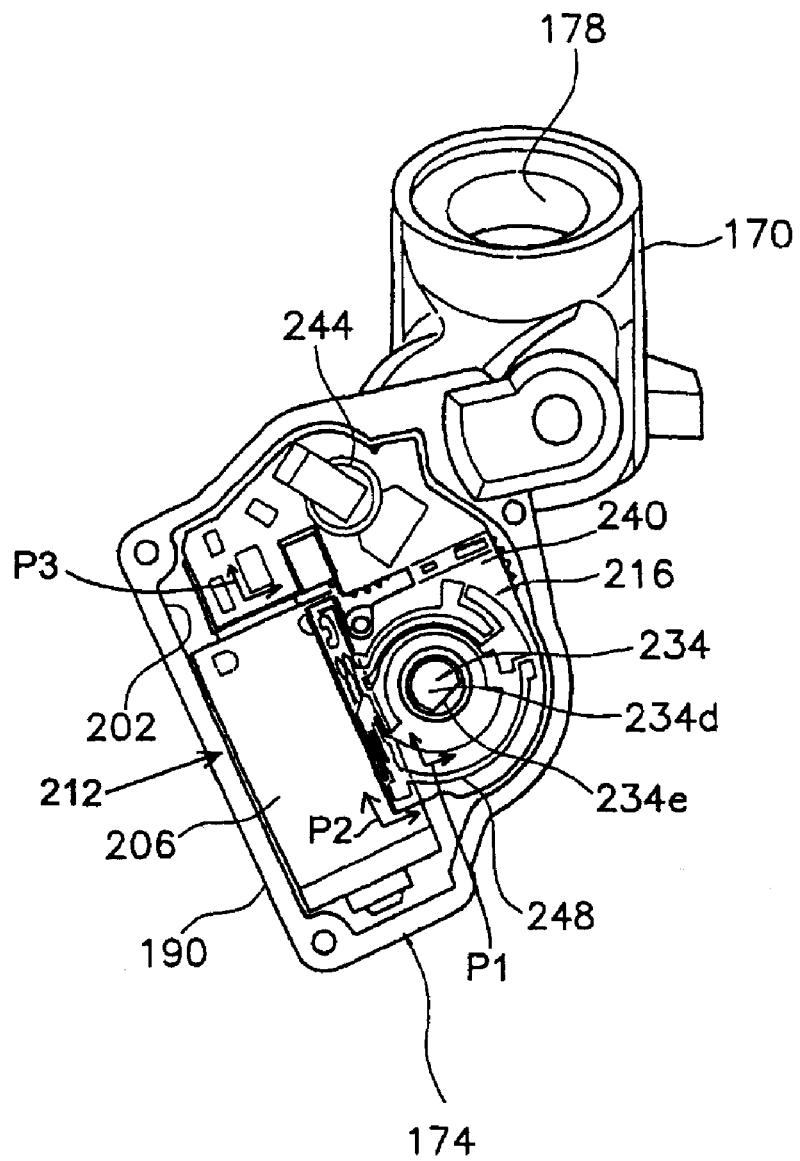
FIG. 3 is an elevational view of a derailleur base member with the cover removed.

Housing unit 174 includes a housing member 190 and a cover 194 that is mounted to housing member 190 by screws 198. Housing member 190 is integrally formed with frame mounting unit 170. Cover 194 preferably is secured to the bottom of housing member 190 so that water and other contaminants do not enter the interior of housing member 190. As shown in FIG. 3, housing member 190 defines a drive mechanism housing space 202 for housing internal components such as a gear shift drive unit 212 and a gear shift control circuit 216 that controls gear shift drive unit 212. Gear shift drive unit 212 electrically drives rear derailleur 52 so that chain guide 108 engages chain 60 with any one of the rear sprockets 54.

Figure 4:
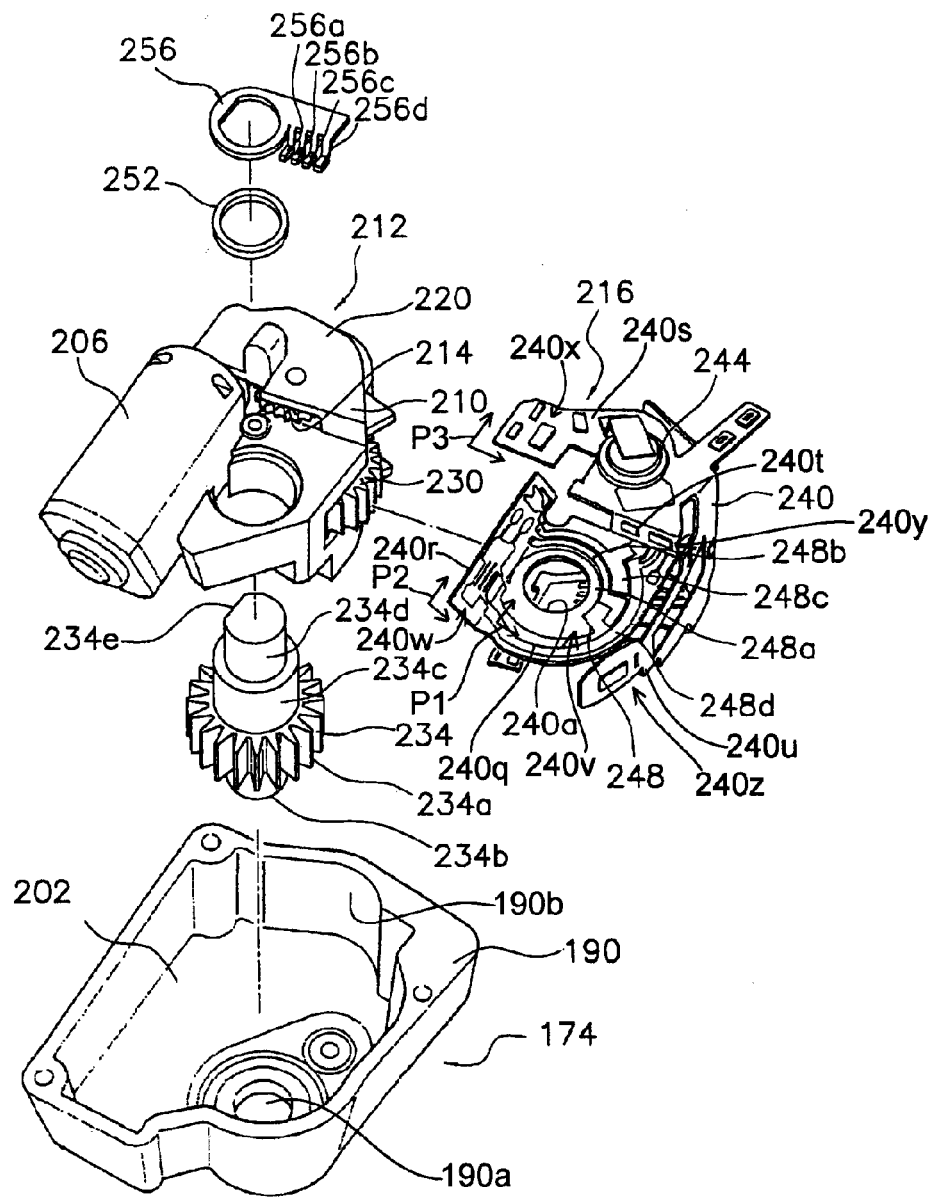
FIG. 4 is an exploded view of electrical components disposed within a housing member formed by the base member.

As shown in FIG. 4, gear shift drive unit 212 comprises an electric motor 206 and a speed reduction mechanism 210, wherein motor 206 is disposed to one side of drive mechanism housing space 202. Speed reduction mechanism 210 comprises a worm gear (not shown), mounted at the distal end of the rotational shaft of the motor 206, that engages a worm wheel (not shown). The worm wheel is integrally formed with a first gear 214, and both components are rotatably supported to a gear support member 220. A second gear (not shown) engages with first gear 214, a third gear 230 is integrally formed with this second gear, and both gears are rotatably supported to gear support member 220. As a result of the foregoing structure, the speed reduction mechanism 210 can be attached or detached as a single unit by attaching or detaching gear support member 220 to or from housing member 190. Third gear 230 engages an output gear 234a of an output shaft unit 234. Output shaft unit 234 further comprises a pivot shaft 234b, an intermediate shaft 234c and an output shaft 234d. Pivot shaft 234b is pivotably supported by a recess 190a in housing member 190. Intermediate shaft 234c is integrally formed with output gear 234a, and output shaft 234d extends from intermediate shaft 234b to a location outside of housing unit 174. Output shaft 234d includes a beveled area (flat) 234e that engages a beveled area (flat) 120a (FIG. 2) on first link member 120 for communicating the rotational force of motor 206 to first link member 120.

The gear shift control circuit 216 comprises a circuit mounting member 240 that supports various compound electronic circuit elements such microprocessors, memory, other types of LSI chips, and individual electronic circuit elements such as resistors, capacitors, conductive traces, and so on. A power storage element 244 such as a large-capacity condenser is mounted to circuit mounting member 240 for storing operating power received from power supply 94 (FIG. 1).

A through-hole 240a is formed in circuit mounting member 240 for receiving output shaft 234d therethrough, and a rotation position detector circuit element 248 is disposed in close proximity to through-hole 240a. In this embodiment, rotation position detector circuit element 248 comprises four concentric arc-shaped conductive traces 248a-248d having different radii and lengths. Another rotation position detector circuit element 256 in the form of a contact brush 256 is non-rotatably mounted to output shaft 234d through an insulating washer 252. Brush 256 has four conductive brush contacts 256a-256d, each of which selectively contacts an associated one of the conductive traces 248a-248d when output shaft 234d is located at different rotational positions. The rotational position of output shaft 234d, and hence the gear position of chain guide 108, may be determined by which combination of conductive traces 248a-248d is being contacted by brush contacts 256a-256d. Brush 256 and conductive traces 248a-248d thus form a gear position sensor 260 (FIG. 5).

In this embodiment, circuit mounting member 240 is a one-piece flexible member comprising a pliable synthetic resin that is formed in a bent fashion such that it covers three sides of gear support member 220 and conforms to an inner wall 190b of housing member 190. For example, circuit mounting member 240 includes sheet members 240q, 240r, 240s, 240t and 240u that support corresponding electronic circuit elements 240v, 240w, 240x, 240y and 240z, wherein sheet member 240q defines a plane P1, sheet member 240r defines a plane P2, and sheet member 240s defines a plane P3. Plane P2 is inclined relative to plane P1, and plane P3 is offset but parallel to plane P1. Sheet member 240q is connected to sheet member 240s through sheet member 240t, wherein sheet member 240t is perpendicular to both sheet members 240q and 240s and forms a stepped portion of circuit mounting member 240. Sheet member 240u extends perpendicularly downwardly from sheet member 240s and has an arcuate shape such that the surface of sheet member 240u that supports electronic circuit elements 240z faces inner wall 190b of housing member 190. As a result of the configuration of circuit mounting member 240, including the varying the position of the various sheet members relative to planes containing electronic circuit elements, motor 206, speed reduction mechanism 212 and gear shift control circuit 216 are disposed within the small drive mechanism housing space 202 in a very compact fashion, even when relatively large circuit elements, such as microprocessors, are used. Since a smaller drive mechanism housing space 202 is needed, the size and weight of the overall derailleur is reduced accordingly.

Figure 5:
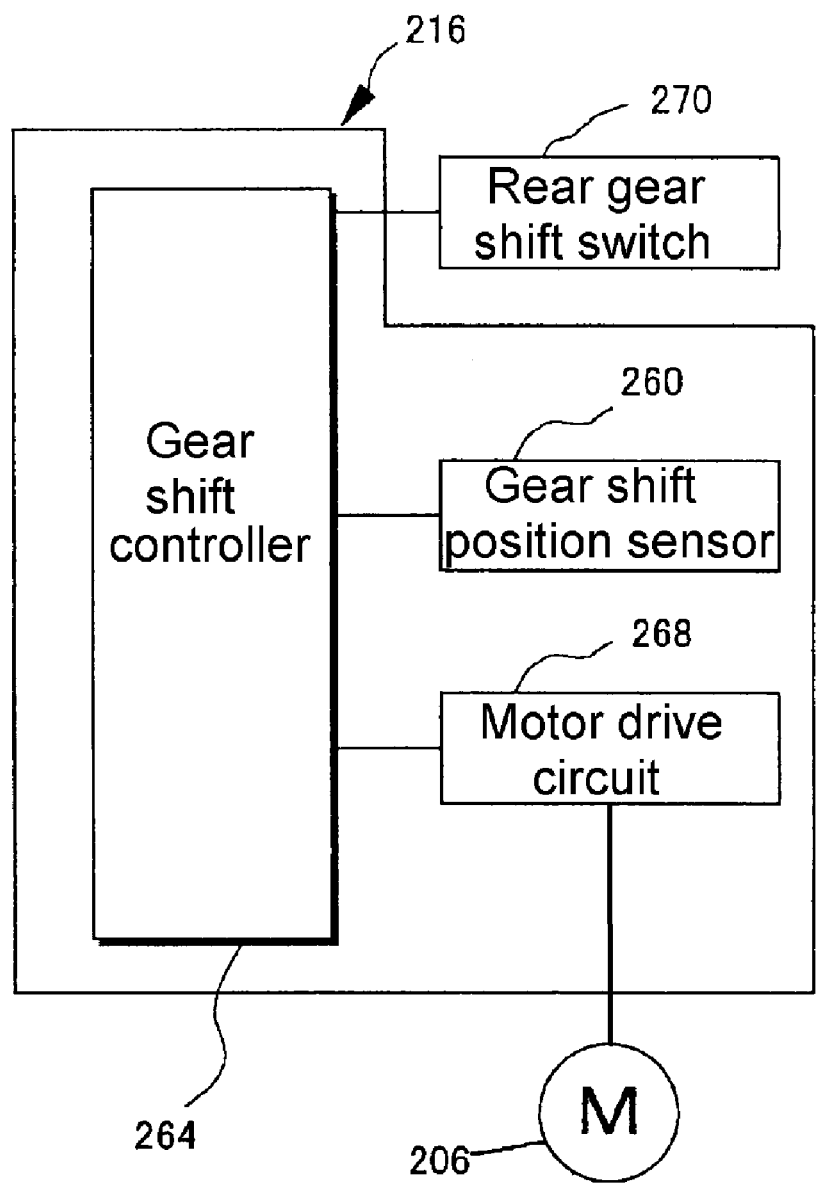
FIG. 5 is a schematic block diagram of a particular embodiment of a gear shift control apparatus.

FIG. 5 is a schematic block diagram of a particular embodiment of gear shift control circuit 216. Gear shift control circuit 216 comprises gear position sensor 260, a gear shift control unit 264 in the form of a microprocessor, and a motor drive circuit 268. Gear shift control unit 264 receives upshift and downshift signals from rear gear shift switch 270 and gear position signals from gear position sensor 260. Motor drive circuit 268 outputs conventional pulse width modulation (PWM) signals to operate motor 206 based on control signals output from gear shift control unit 264 in accordance with the operation of rear gear shift switch 270.

Figure 6:
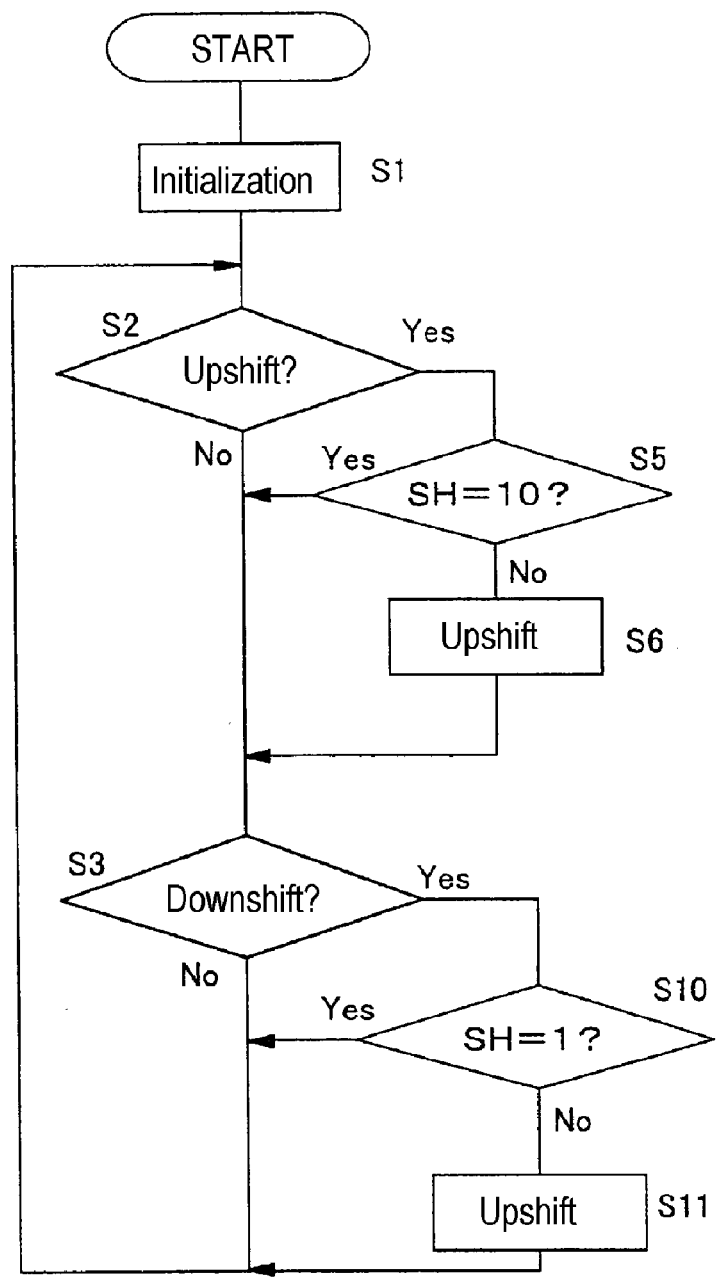
FIG. 6 is a flow chart showing the operation of the gear shift control apparatus.

FIG. 6 is a flow chart showing the operation of gear shift control unit 264. When the power supply to gear shift control unit 264 is turned ON, initialization is carried out in step S1. In step S2, it is determined whether or not an upshift signal has been received from rear gear shift switch 270. If so, it is then determined in a step S5 whether or not a position indicating signal SH output by gear position sensor 260 indicates that rear derailleur 52 currently is in the tenth gear position. If so, then no further upshifting is possible, the upshift signal is ignored, and the process moves to step S3. If derailleur 52 is not in the tenth gear position, then gear shift control unit 264 provides upshift control signals to motor drive circuit 268, and motor drive circuit 268 provides the appropriate operating signal to motor 206 to rotate output shaft 234d to upshift derailleur 52 by one gear.

In any event, it is then determined in step S3 whether or not a downshift signal has been received from rear gear shift switch 270. If so, it is then determined in a step S10 whether or not gear position sensor 260 indicates that rear derailleur 52 currently is in the first gear position. If so, then no further downshifting is possible, the downshift signal is ignored, and the process returns to step S2. If derailleur 52 is not in the first gear position, then gear shift control unit 264 provides downshift control signals to motor drive circuit 268, and motor drive circuit 268 provides the appropriate operating signal to motor 206 to rotate output shaft 234d to downshift derailleur 52 by one gear.

While the above is a description of various embodiments of inventive features, further modifications may be employed without departing from the spirit and scope of the present invention. For example, while a gear shift control circuit 216 was disposed inside rear derailleur 52, many other types of electrical components may be disposed within rear derailleur. For example, gear shift control circuit 216 may be placed outside of the derailleur, and the electronic circuitry disposed within housing space 202 may comprises motor drive circuit 268 and/or other circuits.

Figure 7:
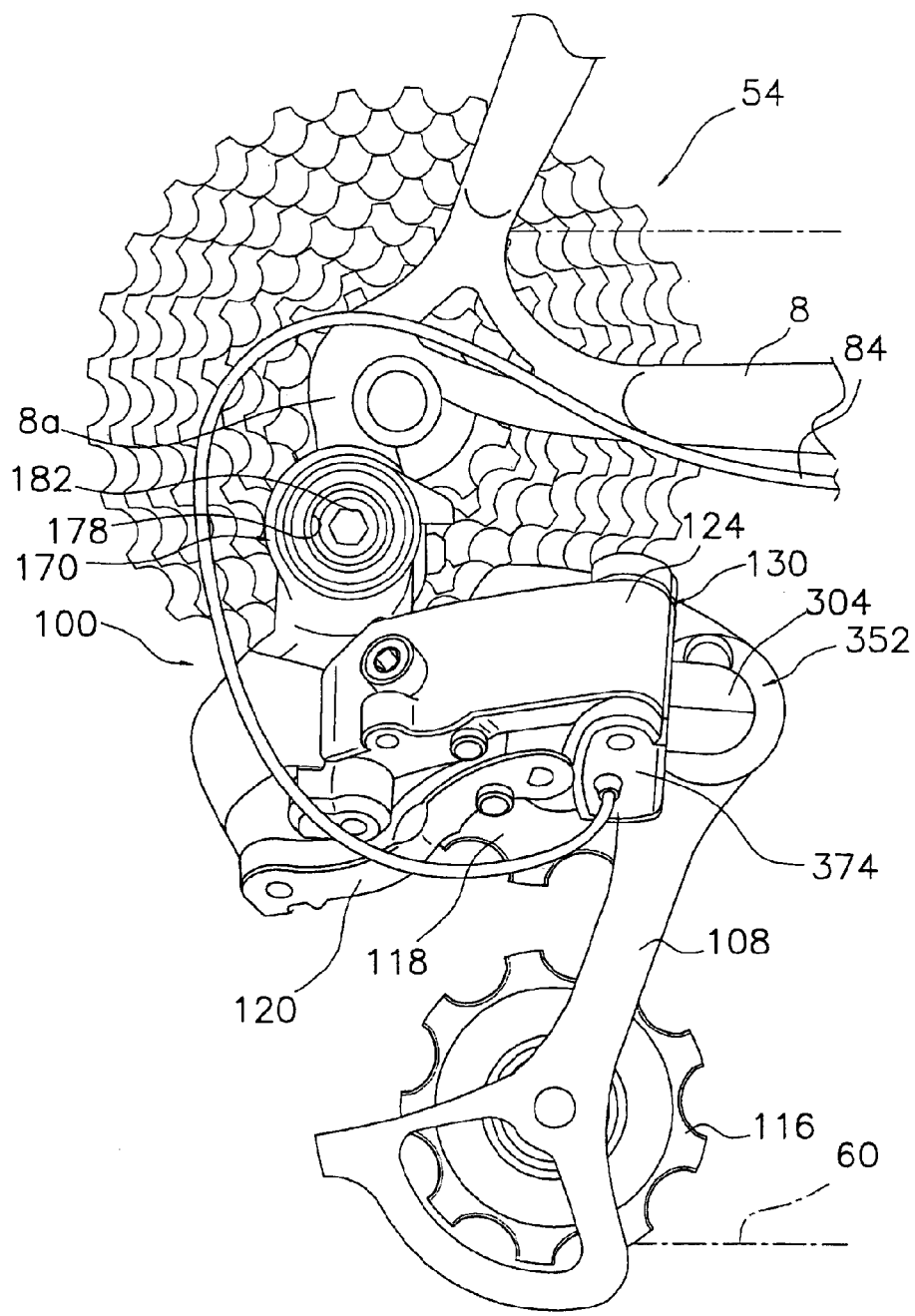
FIG. 7 is a detailed view of another embodiment of a rear derailleur.

While housing unit 174 was disposed on base member 100 in the above embodiment, many other configurations are possible. For example, as shown in FIG. 7, a housing unit 374 of a rear derailleur 352 may be disposed on a movable member 304. In this embodiment, motor 206, gear reduction mechanism 210 and gear shift control circuit 216 may be disposed within drive housing 374, and the other end of first link member 120 is connected to output shaft 234d.

While circuit mounting member 240 was employed in a rear derailleur control mechanism, an appropriate circuit mounting member could be used in a front derailleur control mechanism, a suspension control mechanism, a motor drive pedal assisting mechanism, or some other electrical bicycle component. While moving mechanism 130 for rear derailleur 52 in the disclosed embodiment comprises a pair of link members 120 and 124, many other moving mechanisms are possible. For example, the moving mechanism could comprises a screw shaft that rotates via a motor and nut member mounted to the screw shaft, and the nut member may be connected to the movable member. The moving mechanism may have a scissors configuration, and a gas or electric solenoid may be used as an actuator.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An apparatus for mounting a bicycle electrical component comprising:
    a housing member structured to be mounted to a bicycle;
    an electronic circuit element fixedly mounted to and carried by a flexible circuit mounting member that has a flexible portion, wherein the circuit mounting member is formed as one integral piece, wherein the electronic circuit element processes electrical signals and is a discretely individual member from the circuit mounting member, wherein the electronic circuit element is mounted over a facing surface of the circuit mounting member so that a bottom surface of the electronic circuit element and the facing surface of the circuit mounting member face each other, wherein the facing surface of the circuit mounting member over which the electronic circuit element is mounted forms a plane, and wherein the facing surface of the circuit mounting member over which the electronic circuit element is mounted is disposed in the housing so that the electronic circuit element is exposed to the interior of the housing; and
    an internal component disposed within the housing member, wherein the internal component is separate from the electronic circuit element;
    wherein the facing surface of the circuit mounting member over which the electronic circuit element is mounted extends away from the electronic circuit element and bends away from the plane to form a bent sheet that faces and conforms to a varying shape of an inner peripheral surface of the housing member.

2. The apparatus according to claim 1 wherein at least a part of the flexible portion covers an inner wall of the housing member.

3. The apparatus according to claim 1 wherein the internal component comprises a gear shift drive unit that electrically drives a bicycle gear shift apparatus for a bicycle transmission.

4. The apparatus according to claim 1 wherein the internal component comprises a motor.

5. The apparatus according to claim 4 wherein the internal component further comprises a gear reduction mechanism coupled to the motor.

6. The apparatus according to claim 4 further comprising an output shaft that communicates rotational force from the motor to a location outside the housing member.

7. The apparatus according to claim 6 wherein the circuit mounting member has a through-hole through which the output shaft passes.

8. The apparatus according to claim 7 wherein the electronic circuit element includes a rotation position detector circuit element disposed on the circuit mounting member in close proximity to the through-hole.

9. The apparatus according to claim 8 wherein the rotation position detector circuit is disposed outside of the motor.

10. The apparatus according to claim 1 wherein the circuit mounting member comprises:
    a first sheet member; and
    a second sheet member;
    wherein the first sheet member is slanted relative to the second sheet member.

11. The apparatus according to claim 10 wherein the first sheet member has the electronic circuit element mounted thereon.

12. The apparatus according to claim 11 wherein the second sheet member has a second electronic circuit element externally mounted thereto so that the second electronic circuit element is carried by the second sheet member, wherein the second electronic circuit element processes electrical signals and is a separate member from the second sheet member, wherein the second electronic circuit element is mounted over a facing surface of the second sheet member so that a bottom surface of the second electronic circuit element and the facing surface of the second sheet member face each other.

13. The apparatus according to claim 1 wherein the circuit mounting member comprises:
    a first sheet member; and
    a second sheet member;
    wherein a first plane of the first sheet member is offset from a second plane of the second sheet member.

14. The apparatus according to claim 13 wherein the first plane is substantially parallel to the second plane.

15. The apparatus according to claim 14 wherein the circuit mounting member further comprises a third sheet member connected to and forming a step between the first sheet member and the second sheet member so that the first and second sheet members form first and second upwardly-facing treads of the step and the third sheet member forms a riser between the first and second treads without the second sheet member folding back relative to the first sheet member.

16. The apparatus according to claim 15 wherein the first sheet member has the first electronic circuit element mounted thereto.

17. The apparatus according to claim 16 wherein the second sheet member has a second electronic circuit element externally mounted thereto so that the second electronic circuit element is carried by the second sheet member, wherein the second electronic circuit element processes electrical signals and is a separate member from the second sheet member, wherein the second electronic circuit element is mounted over a facing surface of the second sheet member so that a bottom surface of the second electronic circuit element and the facing surface of the second sheet member face each other.

18. The apparatus according to claim 1 wherein an external surface of the electronic component directly faces an inner peripheral surface of the housing.

19. The apparatus according to claim 1 wherein the facing surface of the circuit mounting member directly faces an inner peripheral surface of the housing.

20. The apparatus according to claim 1 wherein the circuit mounting member comprises:
    a first sheet member defining a first plane;
    a second sheet member defining a second plane;
    a third sheet member defining a third plane; and
    a fourth sheet member;
    wherein the second plane is slanted relative to the first plane;
    wherein the third plane is offset and substantially parallel to the first plane;
    wherein the fourth sheet member is connected between the first sheet member and the third sheet member; and
    wherein the fourth sheet member is substantially perpendicular to the first sheet member and to the third sheet member.

21. The apparatus according to claim 20 wherein the first sheet member, the second sheet member, the third sheet member and the fourth sheet member are formed as one integral piece.

22. The apparatus according to claim 20 wherein the electronic circuit element is fixedly mounted on the circuit mounting member.

23. The apparatus according to claim 22 wherein the electronic circuit element is immovable relative to the circuit mounting member.

24. The apparatus according to claim 1 wherein the electronic circuit element is fixedly mounted on the flexible circuit mounting member.

25. The apparatus according to claim 24 wherein the electronic circuit element is immovable relative to the flexible circuit mounting member.

26. A bicycle derailleur comprising:
    a base member structured to be mounted to a bicycle frame
    a movable member;
    a moving mechanism coupled between the base member and the movable member so that the movable member moves relative to the base member;
    a chain guide coupled to the movable member;
    a housing member disposed on one of the base member or the movable member;
    an electronic circuit element fixedly mounted to and carried by a flexible circuit mounting member, wherein the circuit mounting member is formed as one integral piece, wherein the electronic circuit element processes electrical signals and is a discretely individual member from the circuit mounting member, wherein the electronic circuit element is mounted over a facing surface of the circuit mounting member so that a bottom surface of the electronic circuit element and the facing surface of the circuit mounting member face each other, wherein the facing surface of the circuit mounting member over which the electronic circuit element is mounted forms a plane, and wherein the facing surface of the circuit mounting member over which the electronic circuit element is mounted is disposed in the housing member so that the electronic circuit element is exposed to the interior of the housing; and
    wherein the facing surface of the circuit mounting member over which the electronic circuit element is mounted extends away from the electronic circuit element and bends away from the plane to form a bent sheet that faces and conforms to a varying shape of an inner peripheral surface of the housing member.

27. The derailleur according to claim 26 further comprising:
a motor disposed in the housing member; and
an output shaft that communicates rotational force from the motor to a location outside of the housing member.

28. The derailleur according to claim 27 wherein the moving mechanism comprises:
a first link member having a first end coupled to the output shaft and a second end pivotably coupled to the movable member; and
a second link member having a first end pivotably coupled to the base member and a second end pivotably coupled to the movable member;
wherein rotational force from the motor is communicated through the output shaft to the first link member so that the movable member moves relative to the base member.

29. The apparatus according to claim 26 wherein the electronic circuit element is fixedly mounted on the flexible circuit mounting member.

30. The apparatus according to claim 29 wherein the electronic circuit element is immovable relative to the flexible circuit mounting member.

31. An apparatus for mounting a bicycle electrical component comprising:
a housing member structured to be mounted to a bicycle;
a circuit mounting member disposed in the housing member, wherein the circuit mounting member comprises a plurality of sheet members defining a plurality of different planes and has a shape that varies away from at least one of the plurality of planes;
an electronic circuit element fixedly mounted to and carried by the circuit mounting member;
an internal component disposed within the housing member and separate from the electronic circuit element, wherein the internal component comprises:
a motor;
a gear support member; and
a speed reduction mechanism comprising a plurality of meshed gears supported entirely by the gear support member independently of the housing;
wherein the speed reduction mechanism is coupled to the motor; and
wherein the plurality of meshed gears are configured to be attached or detached as a single assembled unit by attaching or detaching the gear support member to or from the housing member; and
wherein the circuit mounting member covers the gear support member.

32. The apparatus according to claim 31 wherein the circuit mounting member is formed as one integral piece.

33. The apparatus according to claim 31 wherein the electronic circuit element is fixedly mounted on the circuit mounting member.

34. The apparatus according to claim 33 wherein the electronic circuit element is immovable relative to the circuit mounting member.

* * * * *